3,269,902
CATTLE REPELLENT

Lyle D. Goodhue and Roger F. Kleinschmidt, Bartlesville, Okla., assignors to Phillips Petroleum Company, a corporation of Delaware
No Drawing. Filed Aug. 31, 1964, Ser. No. 393,423
16 Claims. (Cl. 167—46)

This invention relates to N,N,1,1-tetramethyl-2-butynylamine, sometimes designated 4-methyl-4-dimethylamino-2-pentyne, as a repellent for bovine animals. A specific aspect of the invention is concerned with the protection of insulated electric cables, such as geophone cables, from chewing damage by bovine animals.

A wide variety of materials have been tested as repellents in various types of tests. For example, repellents are now available which are suitable for protecting various materials from birds, rodents, mosquitoes and a wide variety of other insects.

One domestic animal which is not normally considered a pest, but which frequently causes damage in its feeding habits is the cow. Beef and dairy cattle are found in great numbers throughout the U.S. and most parts of the world, and, for the most part, are not troublesome in their feeding habits. However, in some localities and under certain circumstances considerable damage to certain types of equipment is caused by feeding cattle. One particular type of equipment which is subject to such attack are the electric cables used for connecting geophones in seismograph surveys. It is not known why the cattle are particularly attracted to these cables or why the cable is chewed by the cattle, but seismograph crews lose thousands of dollars worth of cable per year to damage by chewing cattle.

It is therefore a principal object of the invention to provide a method which prevents bovine animals from feeding and/or chewing on objects and materials to be protected. A further object is to provide a method of protecting insulated electric cables, such as geophone cables, from chewing damage by bovine animals and/or rodents. Another object is to provide a method of repelling bovine animals from vegetation which has applied thereon active materials such as herbicides, insecticides, fungicides, and the like which are toxic to the animals, as a protection for the animals. It is also an object of the invention to provide novel compositions for the methods specified. Other objects will become apparent upon consideration of the accompanying disclosure.

A broad aspect of the invention comprises applying the compound N,N,1,1-tetramethyl-2-butynylamine in an amount sufficient to repel bovine animals to objects and materials to be protected from chewing by bovine animals. The novel repellent compound is disclosed and claimed in U.S. Patent 3,137,729 of C. W. Kruse and R. F. Kleinschmidt issued June 16, 1964.

The repellent of this invention is applied to objects to protect them from feeding cattle by such methods as dipping, spraying, brushing, dusting, and the like. A repellent can be applied in these forms as the pure material, but it is preferred to employ it as a solution in solvents such as methanol, ethanol, isopropanol, benzene, toluene, xylene, and the like. The particular solvent which is chosen will depend for the most part on the object which is to be protected. For example, if rubber-insulated electric cables are to be protected, xylene is a particularly useful solvent as it softens the outer surface of the rubber insulation to an extent that the solution is impregnated to some distance below the surface of the cable. The concentration of the novel compound can vary over a wide range, but will generally range from about 1 to 50 percent by weight of the solution. Whatever the method of application, the amount of active repellent which is deposited on the surface of the material should range from about 0.01 to 5 grams per square foot. On another basis, if a material such as a feed is to be treated with the active repellent, the amount applied should be sufficient to provide 0.01 to 5 percent by weight of the active repellent.

While one aspect of this invention comprises protecting equipment from damage by feeding cattle, another aspect thereof is directed to protecting cattle from feeding on materials which will injure or kill the cattle. For example, large numbers of cattle are killed each year by feeding on plans which have been treated with herbicides, insecticides, fungicides, etc. While in most cases the farmer or rancher using herbicides, etc. tries to keep cattle out of areas containing these materials, the cattle frequently manage to get to the treated plants containing these toxic materials. Hence, applying the novel repellent compound to the vegetation after spraying the toxic material thereon or applying it thereto repels the cattle so that they are protected from the toxic materials. The repellent of the invention may also be applied in admixture with the insecticide, herbicide, fungicide, etc. in a suitable adjuvant or dispersing agent such as in the form of an emulsion in water. Common materials of the class described include DDT, Aldrin, Dieldrin, Chlordane, 2,4-D, 2,4,5-T, pentachlorophenol, and the like.

In a further embodiment of this invention, when the cattle repellent of this invention is to be employed to protect equipment such as cables and the like, it is used in mixture with other materials which are also applied to such equipment, such as rodent repellents. One particular rodent repellent which can be readily employed in mixtures with this cattle repellent is the type comprising N,N-dimethyl alkylsulfenyl dithiocarbamates such as N,N-dimethyl-S-methylsulfenyl dithiocarbamate and N,N-dimethyl-S-tert-butylsulfenyl dithiocarbamate. These rodent repellents are more fully described in U.S. Patent 2,862,850 of L. D. Goodhue, issued December 2, 1958.

The active repellent of this invention, N,N,1,1-tetramethyl-2-butynylamine, is prepared by the reaction of dimethylamine with two mols of methylacetylene (propyne) in the presence of zinc and cadmium acetates according to the method of the aforesaid patent of C. W. Kruse and R. F. Kleinschmidt.

The following specific examples are intended to illustrate the effectiveness of the novel cattle repellent, but it is not intended that the invention be limited to the specific features shown in these tests.

Example I

A series of tests were carried out in which cattle feed was mixed with candidate repellents and offered to yearling steers.

In these tests, one gram of the candidate repellent was applied to one kilogram of cattle feed as a solution in ethanol. The feed was stirred while spraying on the solution of candidate chemical, after which the ethanol was allowed to evaporate.

A portion of the treated feed was placed in the lid of a 1-gallon ice cream carton and exposed to cattle. The sample which had been treated with 0.1 percent by weight of N,N,1,1-tetramethyl-2-butynylamine was not eaten by the cattle over a 60-day period. On the other hand, feed samples which contained 0.1 weight percent of either N,N-diethyl-1,1-dimethyl-2-butynylamine or N,N-dibutyl-1,1-dimethyl-2-butynylamine were both consumed on the first day. These latter two compounds are the higher homologs of the active repellent compound as they differ only in the substituent alkyl groups on the amino nitrogen. Thus the compound containing methyl groups on the amino nitrogen was 100 percent effective while the similar compounds containing either ethyl groups or n-butyl groups on the amino nitrogen were completely ineffective.

*Example II*

In another test, rubber insulated cables to which N,N,1,1-tetramethyl-2-butynylamine had been applied, were exposed to feeding cattle.

In these tests, 8' lengths of rubber insulated cable were dipped in 5 percent and 10 percent xylene solutions of unpurified N,N,1,1-tetramethyl-2-butynylamine which contained about 50 percent of the active compound. An 8' length of the cable was also dipped in a 10 percent xylene solution of N,N-dimethyl-S-tert-butylsulfenyl dithiocarbamate, a commercial rodent repellent.

The treated cable samples and some untreated check cables were placed in plastic-lined boxes covered with untreated cattle feed and exposed to hungry cattle for ½ hour periods. On the first exposure, yearling steers ate the feed over the untreated check cables and chewed the cables badly. The same results were obtained with the cables which had been dipped in a solution of rodent repellent. No feed was even consumed from the boxes containing the cables which had been impregnated with N,N,1,1-tetramethyl-2-butynylamine. Thirty-four days later the same cables were used in a test identical to the first exposure except that fresh untreated feed was used. The same results were obtained and there was no feeding by the cattle of the feed over the N,N,1,1-tetramethyl-2-butynylamine-treated cable.

Fourteen days later the same cables were again tested using fresh cattle feed and the same results were obtained.

*Example III*

Field tests were carried out in which rubber-insulated geophone cables, some treated with N,N,1,1-tetramethyl-2-butynylamine, some treated with N,N-dimethyl-S-tert-butylsulfenyl dithiocarbamate, and some untreated checks were exposed to livestock and rats in areas in which geophone cables were being regularly damaged by these animals. In one test, two geophone cables, one untreated and one impregnated with a 5 percent solution of N,N,1,1-tetramethyl-2-butynylamine in a 50/50 mixture of xylene and methyl ethyl ketone, were laid out on a bulldozed trail approximately 3' apart. The treated cable was slightly chewed only on the ends where the untreated taped connections were located, but the untreated cable was chewed severely on all but 7' of its 32' length.

In a similar test one cable was impregnated with N,N-dimethyl-S-tert-butylsulfenyl dithiocarbamate and the other cable was impregnated with N,N,1,1-tetramethyl-2-butynylamine. The cable which was impregnated with the cattle repellent of this invention was slightly chewed on about 1' of one end while the cable which was impregnated with the commercial rodent repellent was chewed completely in two by cattle.

In a still further test, two 32' cables, one impregnated with the commercial rodent repellent and the other impregnated with the cattle repellent of this invention, were traced along a trail approximately 2 feet apart. The cable treated with the cattle repellent of this invention was chewed very slightly as if one cow made one bite on it, while the cable treated with commercial rodent repellent was chewed slightly for 3', moderately for 4', and very severely for 1'.

*Example IV*

A field test was carried out on a ¼ acre plot of grazing pasture for a herd of bovine animals maintained at a well known university engaged in disseminating knowledge in the field of animal husbandry as well as in the other arts. The ¼ acre plot was selected in a choice area of a large pasture and was cleared of bovine animal droppings. The ¼ acre plot was sprayed with a one weight percent aqueous emulsion of N,N,1,1-tetramethyl-2-butynylamine until the grass was substantially completely wet. The plot was then observed during daylight hours for a period of 10 days during which no cattle were seen to graze on said pilot and no droppings appeared on the plot. There was no obstruction of any kind immediately surrounding the ¼ acre plot so that cattle had free access thereto. During the period of 10 days no cattle were observed on the plot but on the 10th day some droppings were found thereon. During each of the 10 days the cattle were observed eating grass in the area surrounding the plot.

Examples of suitable solvents or carriers for the repellent of the invention and also for the rodent repellent include straight and branched chain hydrocarbons such as n-pentane and isoheptane, cyclic paraffinic hydrocarbons containing at least five carbon atoms such as cyclooctane and mixtures of such hydrocarbons. Water may be used advantageously to form emulsions of said compounds for spraying. When preparing aqueous emulsions, wetting or emulsifying agents such as Triton X–100 (alkyl aryl polyether alcohol), Dresinate 731 (sodium salt of a disproportionated rosin acid), Tween 20 (sorbitan monolaurate polyethylene oxide) and the like are employed in sufficient quantity to stabilize the emulsion. For best and now greatly preferred results, in any event, the compositions of the invention, as applied, are made up to contain a repellent adjuvant to dilute the active ingredients to an effective, but not undesirably high, concentration. Generally, the repellent adjuvants known in the art can be employed; however, those set forth are now preferred. Solutions or emulsions containing from 1 to 20 percent by weight of the active ingredient can be employed to incorporate said active ingredient with the material being treated.

Certain modifications of the invention will become apparent to those skilled in the art and the illustrative details disclosed are not to be construed as imposing unnecessary limitations on the invention.

We claim:

1. A method for protecting objects and materials attractive to the taste of a bovine animal which comprises applying to said objects and materials, in an amount sufficient to effectively repel said animals, the compound N,N,1,1-tetramethyl-2-butynylamine.

2. The method of claim 1 wherein said compound is applied dispersed in a liquid inert to said compound in a concentration in the range of 1 to 50 weight percent of the liquid mixture.

3. The method of claim 1 wherein the amount of said compound applied is in the range of about 0.01 to 5 grams per square foot of surface to be protected.

4. A method of protecting geophone and other insulated electric cables from chewing by bovine animals which comprises applying to a cable of the character described, in an amount sufficient to effectively repel said animals, the compound N,N,1,1-tetramethyl-2-butynylamine.

5. The method of claim 4 wherein said cable is rubber coated and said compound is applied dispersed in a hydrocarbon which softens the rubber surface and impregnates the rubber with said compound.

6. The method of claim 5 wherein said hydrocarbon is a xylene.

7. The method of protecting vegetation from feeding bovine animals which comprises applying to said vegetation, in an amount effective in repelling said animals, the compound N,N,1,1-tetramethyl-2-butynylamine.

8. The process of claim 7 wherein said compound is applied as an aqueous emulsion at a concentration in the range of about 1 to 50 weight percent of the emulsion.

9. The process of claim 8 wherein at least one member of the group consisting of insecticides, herbicides, and fungicides is incorporated in said emulsion.

10. The method of protecting objects and materials from chewing damage by bovine animals and rodents which comprises applying thereto a mixture of the compound N,N,1,1-tetramethyl-2-butynylamine and a rodent repellent of the group consisting of N,N-dimethyl-S-tert-butylsulfenyl dithiocarbamate and N,N-dimethyl-S-methylsulfenyl dithiocarbamate in amounts which effectively repel said animals and said rodents.

11. The method of claim 10 applied to an electrical cable such as a geophone cable.

12. The method of claim 7 applied to vegetation having a material of the group consisting of insecticides, fungicides, and herbicides in active state thereon injurious to said animals.

13. A composition consisting essentially of the compound N,N,1,1-tetramethyl-2-butynylamine and a member of the group consisting of N,N-dimethyl-S-tert-butylsulfenyl dithiocarbamate and N,N-dimethyl-S-methylsulfenyl dithiocarbamate.

14. The composition of claim 13 dispersed in a liquid dispersant.

15. The composition of claim 13 dispersed in water as an emulsion.

16. The composition of claim 13 dispersed in a liquid hydrocarbon containing an emulsifying agent.

References Cited by the Examiner

UNITED STATES PATENTS

| | | | |
|---|---|---|---|
| 2,222,638 | 11/1940 | Szilard | 174—116 |
| 2,222,639 | 11/1940 | Pirk | 174—121 |
| 2,862,850 | 12/1958 | Goodhue | 167—46 |
| 3,137,729 | 6/1964 | Kruse et al. | 260—583 |

OTHER REFERENCES

Chem. Abstracts, vol. 51, pages 10764i–10765a (1957).

LEWIS GOTTS, *Primary Examiner.*

S. K. ROSE, *Assistant Examiner.*